United States Patent
Klingler

(10) Patent No.: US 6,648,119 B1
(45) Date of Patent: Nov. 18, 2003

(54) ADJUSTING DEVICE

(75) Inventor: Knud Klingler, Linz (AT)

(73) Assignee: Schukra Geratebau AG, Leonding (AT)

( * ) Notice: Subject to any disclaimer, the term of this patent is extended or adjusted under 35 U.S.C. 154(b) by 0 days.

(21) Appl. No.: 09/958,104

(22) PCT Filed: Apr. 3, 2000

(86) PCT No.: PCT/EP00/02956

§ 371 (c)(1),
(2), (4) Date: Dec. 27, 2001

(87) PCT Pub. No.: WO00/59753

PCT Pub. Date: Oct. 12, 2000

(51) Int. Cl.[7] .............................. B60N 2/44; F16D 41/10; F16D 43/02
(52) U.S. Cl. ......................................... 192/223; 192/19
(58) Field of Search ............................ 192/223, 15, 19, 192/75, 77, 78, 99 R; 297/361.1, 362, 374; 188/325, 333; 74/531

(56) References Cited

U.S. PATENT DOCUMENTS

| | | | | | |
|---|---|---|---|---|---|
| 907,074 A | * | 12/1908 | Maybach | ...................... | 192/77 |
| 943,977 A | * | 12/1909 | Kroyer | ......................... | 192/77 |
| 985,286 A | * | 2/1911 | Sailer | ........................... | 192/77 |
| 1,804,310 A | * | 5/1931 | Bricard | ........................ | 192/15 |
| 1,998,659 A | * | 4/1935 | Dodge | ......................... | 192/78 |
| 3,051,282 A | * | 8/1962 | Greene | ....................... | 192/223 |
| 3,126,983 A | * | 3/1964 | Huntress | ...................... | 192/77 |
| 3,587,796 A | * | 6/1971 | Nestvogel | ................... | 192/223 |
| 4,236,618 A | * | 12/1980 | West | ........................... | 192/223 |
| 4,260,045 A | * | 4/1981 | Hack | ........................... | 192/223 |
| 4,371,207 A | | 2/1983 | Wilking et al. | | |
| 4,786,110 A | | 11/1988 | Mahling et al. | | |
| 5,180,207 A | | 1/1993 | Schmidt | | |
| 5,277,672 A | | 1/1994 | Droulon et al. | | |
| 5,522,488 A | | 6/1996 | Schwarzbich | | |
| 5,634,380 A | | 6/1997 | Scholz et al. | | |
| 5,634,689 A | | 6/1997 | Putsch et al. | | |
| 5,794,479 A | | 8/1998 | Schwarzbich | | |
| 5,871,414 A | | 2/1999 | Voss et al. | | |

FOREIGN PATENT DOCUMENTS

| | | | | |
|---|---|---|---|---|
| DE | 19518424 | 11/1986 | ........... | F16D/41/20 |
| DE | G9107485.1 | 6/1991 | ........... | B60N/2/48 |
| EP | 0406089 | 6/1990 | ........... | B60N/2/22 |
| EP | 0662403 | 3/1998 | ........... | B60N/2/22 |
| WO | WO99/05000 | 2/1999 | ........... | B60N/2/06 |

* cited by examiner

Primary Examiner—Rodney H. Bonck
(74) Attorney, Agent, or Firm—Robert C. Haldiman, Esq.; Grant D. Kang, Esq.; Husch & Eppenberger, LLC

(57) ABSTRACT

The invention relates to an adjusting device for an adjusting element which is arranged on a shaft, can be adjusted as desired in both directions of rotation by means of a drive and can be locked in any set position. The device has two jaws which can be moved together in a housing by means of the drive and, at least one end, are each in zero-play contact with an arm of a scissors-type arrangement, the opposing arms of the scissors-type arrangement being in zero-play contact with an output drive element which is rotatably mounted and connected to the adjusting element.

20 Claims, 7 Drawing Sheets

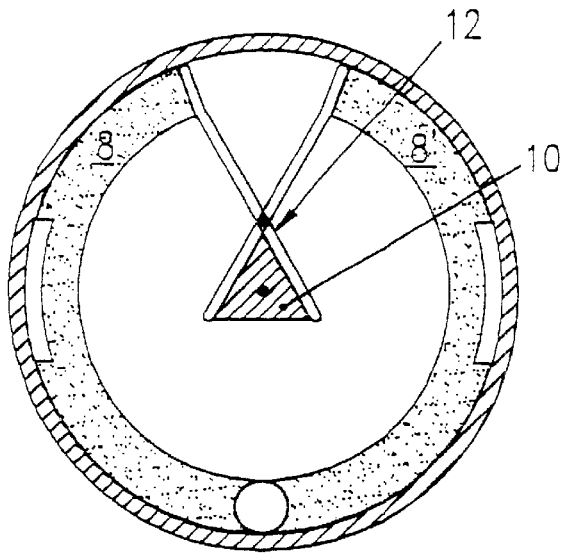
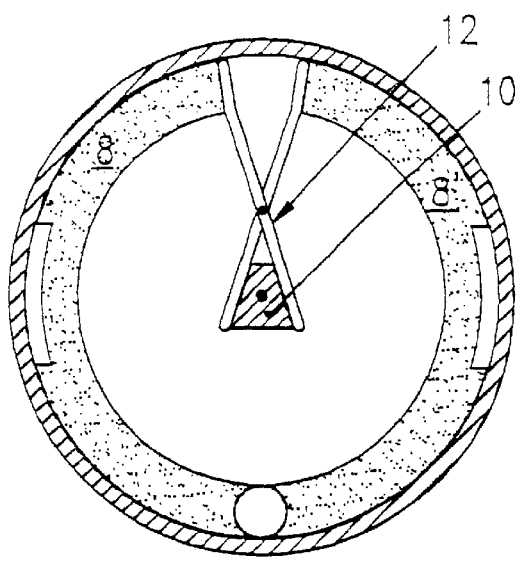
Fig.5b　　　　　　　　　　　Fig.5c
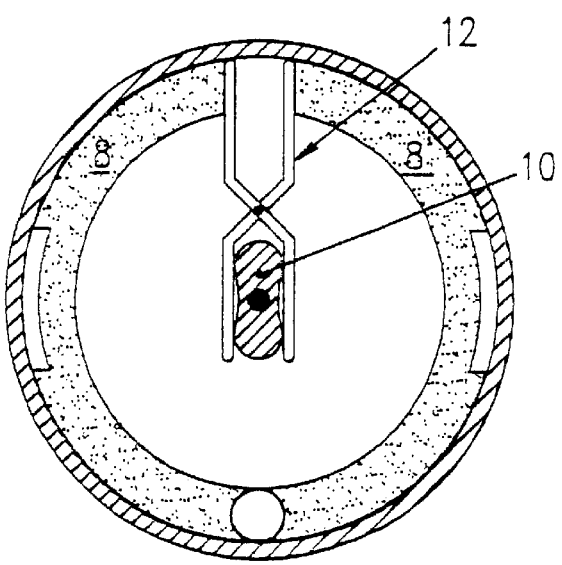
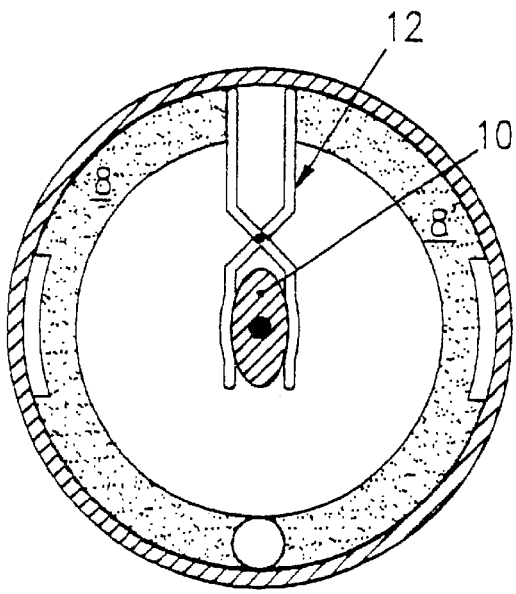
Fig.5d　　　　　　　　　　　Fig.5e

ADJUSTING DEVICE

The invention relates to an adjusting device for an adjusting element which is arranged on a shaft, can be adjusted as desired in both directions of rotation by means of a drive and can be locked in any set position.

An adjusting device of this type is disclosed by DE-A1-195 18 424 and also by EP-B1-0 662 403.

The known adjusting devices have an extremely complicated construction and are therefore complicated to mount and costly.

It is an object of the invention to improve an adjusting device of the type mentioned at the beginning to the effect that it has a simple construction, which permits rapid mounting and can be produced cost-effectively.

This object is achieved by an adjusting device according to the present invention.

Advantageous refinements of the present invention are described in detail below with reference to the corresponding illustrations.

Figure 1A:
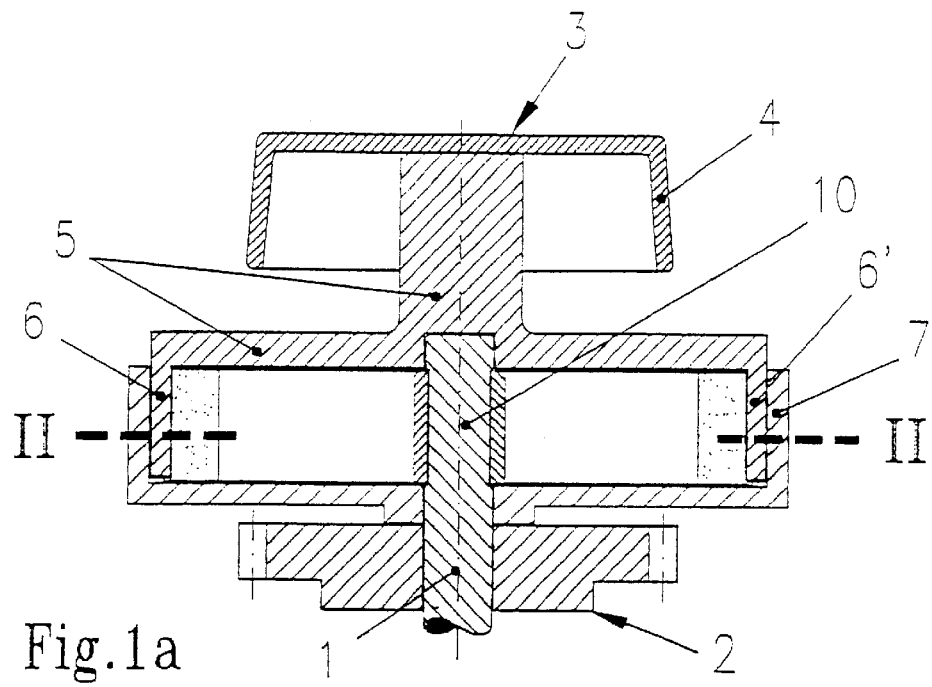
Figure 2A:
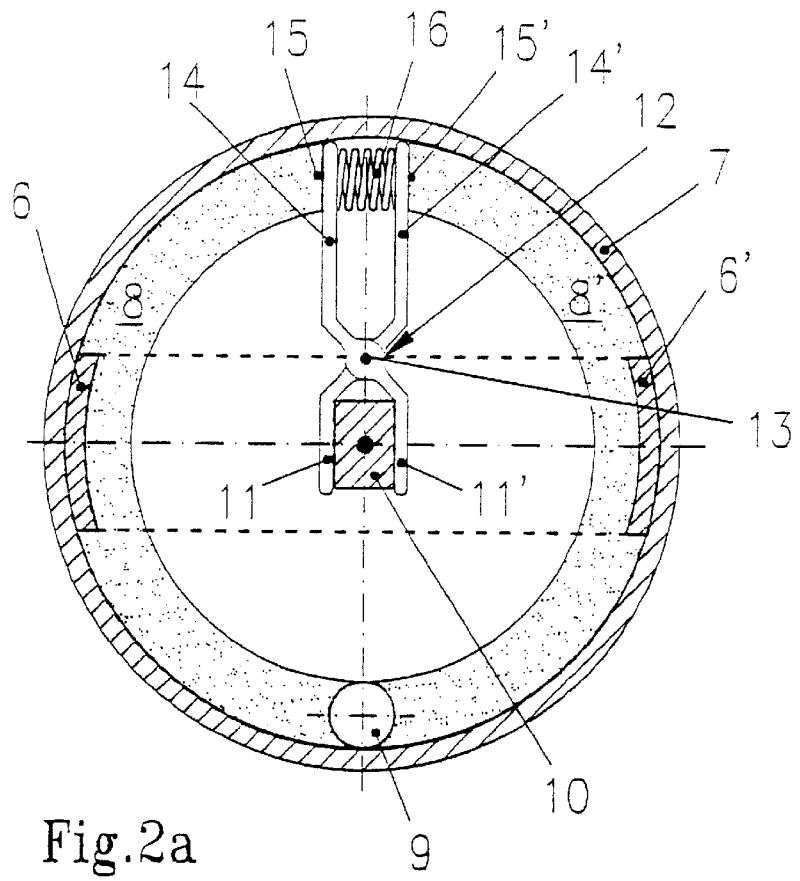
Figure 3A:
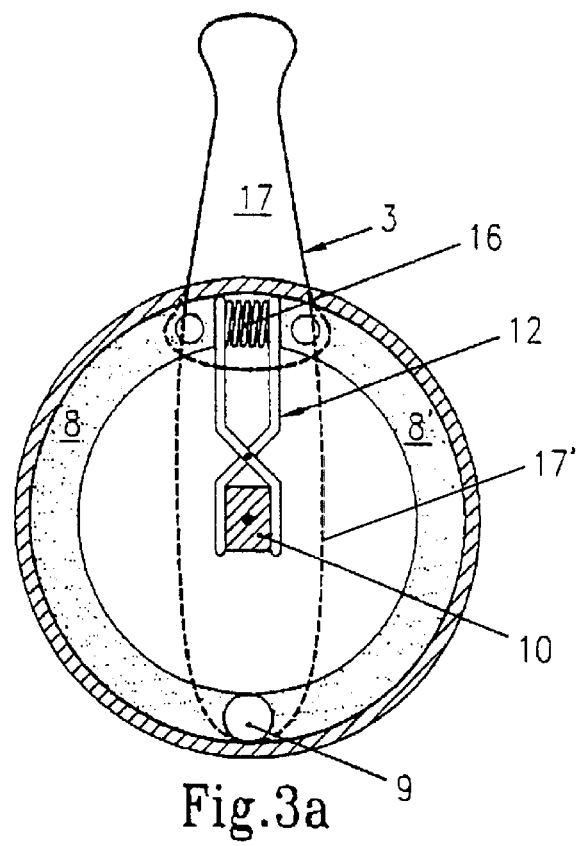
Figure 4:
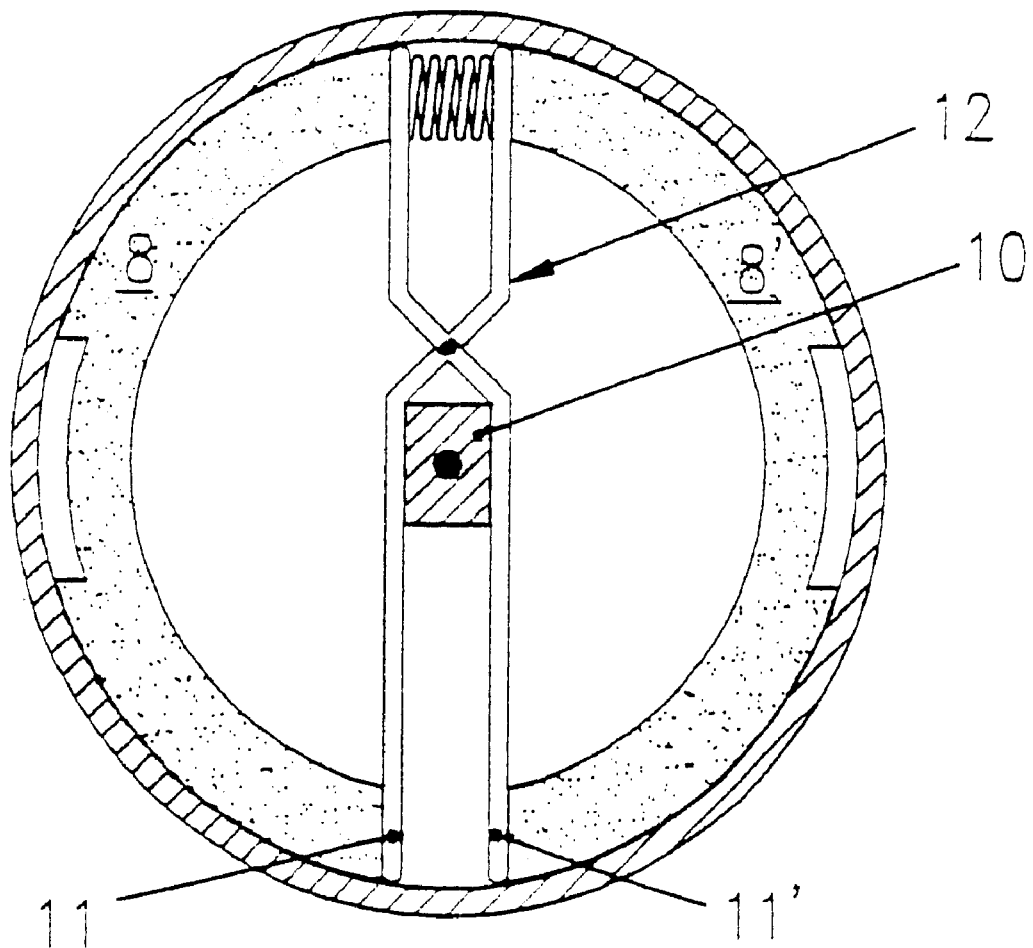
Figure 6A:
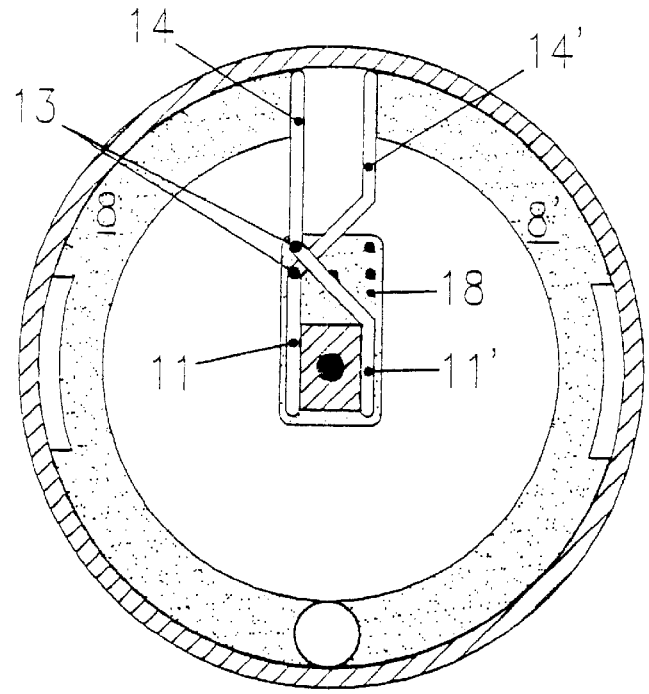

The invention will be explained in more detail below using exemplary embodiments and with reference to drawings, in which:

FIGS. 1a, b show cross sections through an exemplary embodiment of an adjusting device, the sections being located in planes shifted through 90° with respect to each other;

FIGS. 2a, b show cross sections along the line II—II from FIGS. 1a and b;

FIGS. 3a, b show design variants of an adjusting device having levers;

FIG. 4 shows a further design variant of an adjusting device;

FIGS. 5a to f show design variants of adjusting devices, output drive elements of various configurations cooperating with various scissors-type arrangements;

FIGS. 6a and b show design variants of the adjusting device having a plate.

Figure 2B:
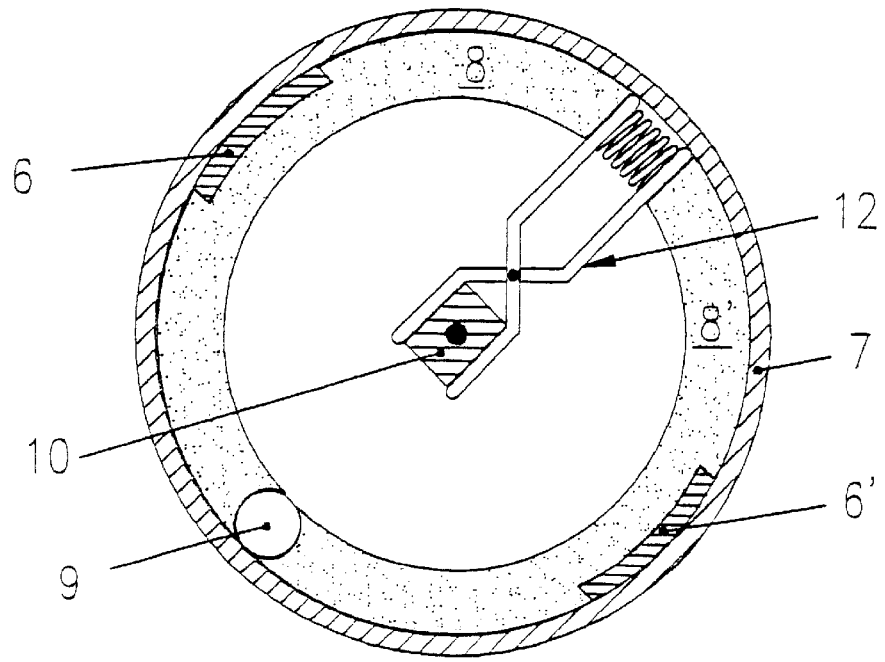

The design variant shown in FIGS. 1a, b and 2a, b of an adjusting device has an adjusting element 2 which is arranged on a shaft 1 and which can be adjusted as desired in both directions of rotation by means of a drive 3. The drive in this exemplary embodiment comprises a handwheel 4, which is firmly connected so as to rotate with a driver 5 having angled projections 6, 6'. The projections 6, 6' of the driver 5 engage in two jaws 8, 8' which can be moved along the central circumference of a circular housing 7 and, by means of the drive 3, can be moved jointly within the housing 7, for example into the position shown in FIG. 2b.

Instead of a manual drive, a motor drive, in particular an electric-motor drive (not illustrated), can also be employed.

Figure 1B:
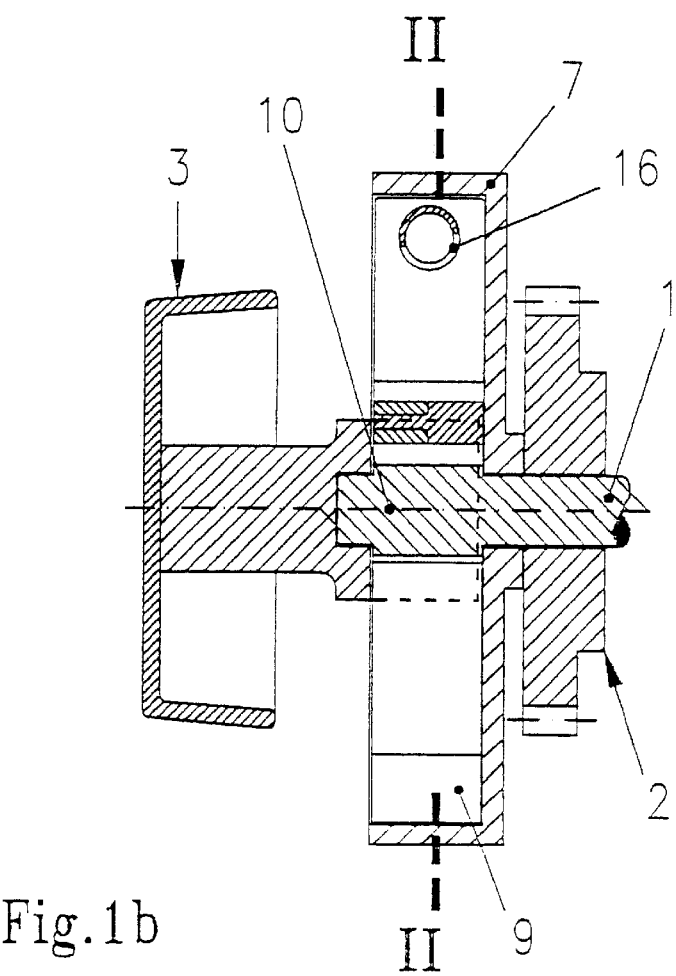

In the exemplary embodiment illustrated in FIGS. 1, 2, the jaws 8, 8' are supported on a common bearing 9, which is designed here as a roller, that is to say as a roller bearing, the jaws 8, 8' having appropriately configured supporting faces.

Arranged on the shaft 1 is an output drive element 10 permanently connected to it. In the exemplary embodiment illustrated, the output drive element 10 is arranged coaxially with the shaft 1 and has a rectangular cross section. The output drive element 10 is in contact with the arms 11, 11' of a scissors-type arrangement 12, which are arranged such that they can pivot about a common pivot 13, the corresponding opposing arms 14, 14' associated with the arms 11, 11' being in contact with the free ends 15, 15' of the jaws 8, 8'.

The arms 11, 11', 14, 14' of the scissors-type arrangement 12 are preferably in zero-play contact with the ends 15, 15' of the jaws 8, 8' and with the output drive element 10. It is possible for a spring 16 to be arranged between the opposing arms 14, 14' and to press the opposing arms 14, 14' of the scissors-type arrangement 12 against the ends 15, 15' of the jaws 8, 8'.

The pivot 13 can be arranged at any desired height between the output drive element 10 and the ends 15, 15' of the jaws 8, 8', as a result of which the lever forces of the scissors-type arrangement 12 can be varied.

The contact between the arms 14, 14' of the scissors-type arrangement 12 and the ends 15, 15' of the jaws 8, 8' can be made over an area (see FIG. 2a), over part of an area or at a point (not shown). The contact area or part contact area between the jaws 8, 8' and the arms 14, 14' can be designed at any desired angle to the radius of the housing 7. In a corresponding way, in the case of a point-like configuration, the contact can be provided at any desired point at the ends 15, 15' of the jaws 8, 8'. As a result of these measures, the friction between the jaws 8, 8' and the housing 7 can be influenced by the introduction of different forces.

In the exemplary embodiment shown in FIG. 3a, the drive 3 comprises a lever 17 connected to the jaws 8, 8' in an articulated manner. In the case of this linkage, during a movement of the lever 17, the spring 16 is initially compressed, as a result of which easier displacement of the jaws 8, 8' and therefore of the adjusting element 2 is possible, since in this way the pressure of the jaws 8, 8' on the housing 7 is reduced or virtually eliminated.

Figure 3B:
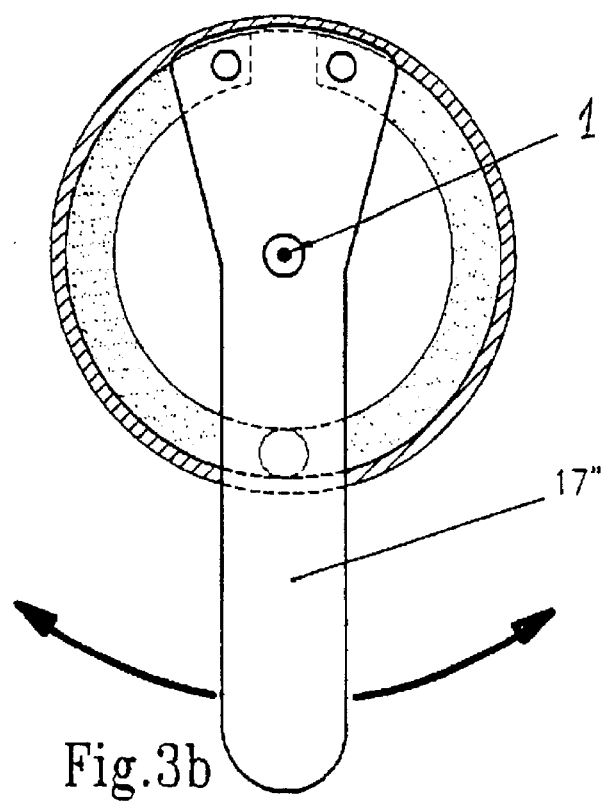

Illustrated in dashed form in FIG. 3a is a lengthened lever 17', which here is rotatably mounted in the area of the bearing 9 between the jaws 8, 8'. In the case of this lengthened lever 17', the free ends of the jaws 8, 8' are fixed to the lever 17' with play, in order to avoid one of the jaws 8, 8' pressing on the housing 7 during any actuation of the lever 17'. Shown in FIG. 3b is a lever 17", which is rotatably arranged coaxially with or on the shaft 1. Here, too, the jaws 8, 8' are connected to the lever 17" with play, no spring being provided between the jaws 8, 8'.

In the case of the exemplary embodiment shown in FIG. 4, the arms 11, 11' of the scissors-type arrangement 12 that are connected to the output drive element 10 are lengthened and are in contact with the other ends of the jaws 8, 8', a bearing being dispensed with.

Figure 5A:
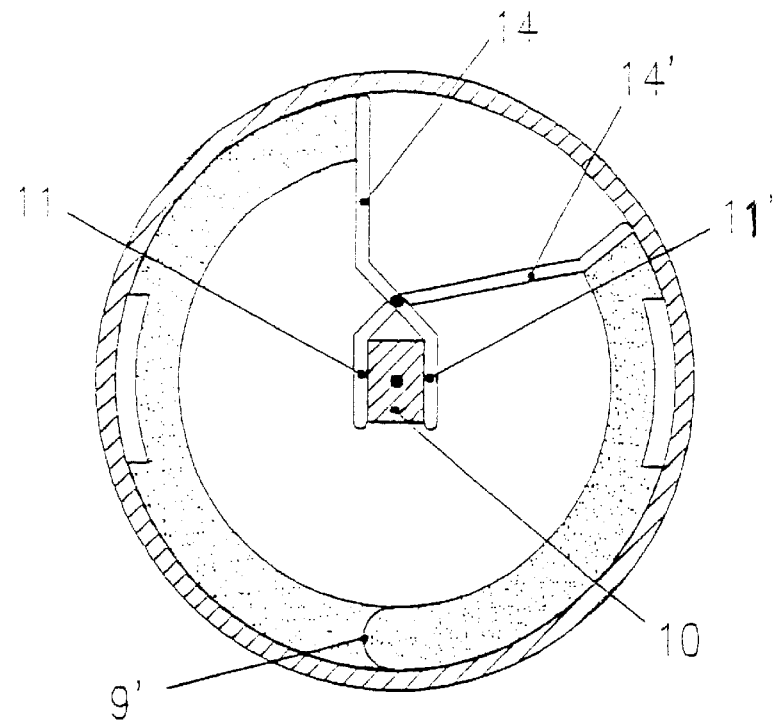
Figure 5F:
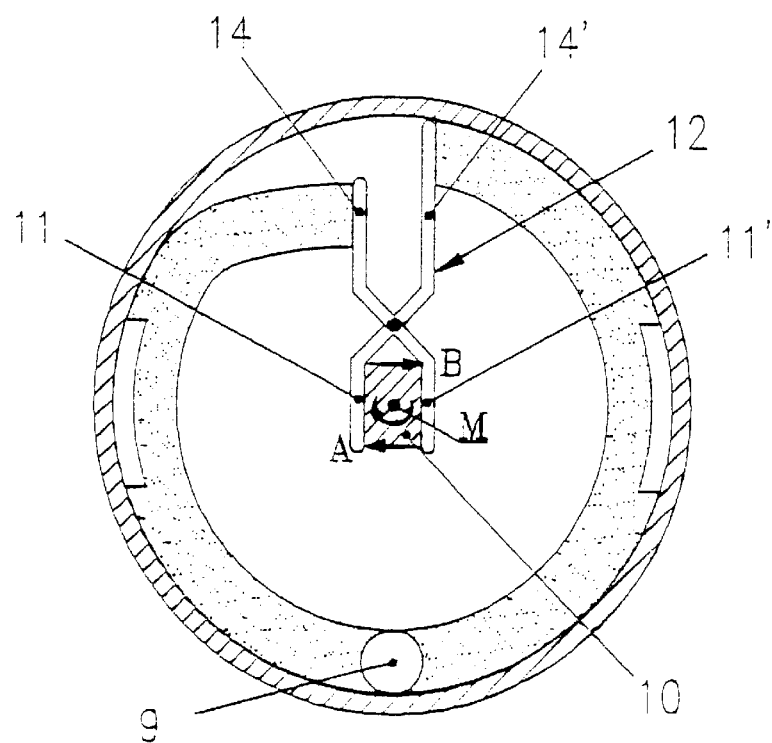

FIG. 5 shows different cross sections of the output drive element 10. In addition to a rectangular cross section, as in FIG. 2, cross sections of output drive elements 10 having triangular, rounded-off and rounded edges (see, in particular, FIG. 5e) are illustrated, also the jaws 8, 8' with different lengths and also bearings 9' (for example balls in a dome) resting on the circumference of the housing 7 (see, in particular, FIGS. 5a and 5f). The different lengths of jaws 8, 8' and arms 11, 11' and opposing arms 14, 14' result in different lever arms and therefore different force transmission paths, by which means the frictional force between the housing 7 and the jaws 8, 8' can be influenced. The rounded designs according to FIGS. 5d and 5e allow the transmission paths to be configured from soft to hard, it also being possible for the respective contact areas between the output drive element 10 and the arms 11, 11' to be varied as desired. FIG. 5f shows a design variant in which the force relationships with respect to the points of action A and B of the output drive element 10, as it is rotated in the direction of the arrow, are approximately equal on the arms 11, 11' and on the jaws 8, 8' via the opposing arms 14, 14'.

Further possible modifications permit the exemplary embodiments according to FIGS. 6a and b, which have a plate 18 which can be rotated freely with respect to the output drive element 10. The plate 18 shown in FIG. 6a permits a different definition of the respectively desired axes of rotation of the scissors-type arrangement 12 which, as shown there, do not have to coincide either.

Figure 6B:
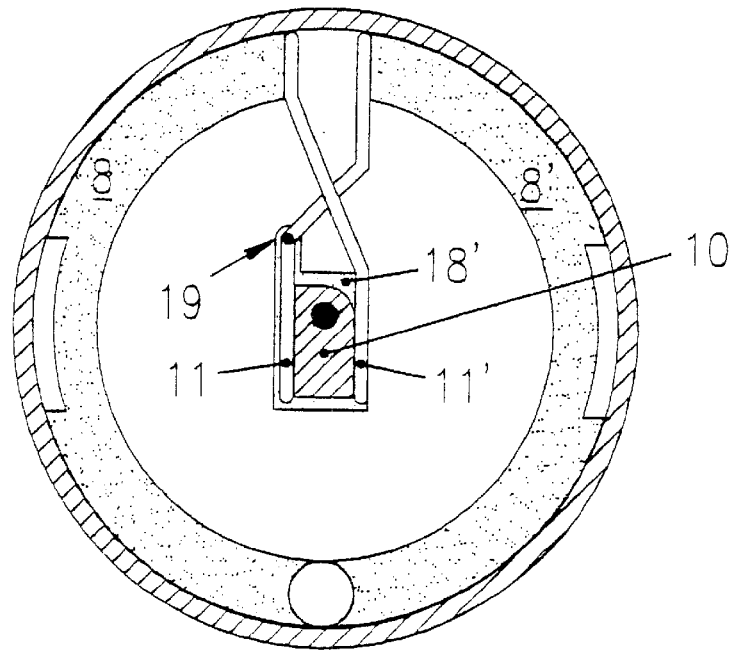

FIG. 6b shows a variant having a plate 18', one arm 11' being firmly connected to the plate 18' which, as illustrated, can also be arranged eccentrically with respect to the shaft 1 and which additionally makes it possible for the pivot 13' of the scissors-type arrangement 12, here of the arm 11, to be displaced, for example onto a projection 19 of the plate 18'.

The eccentric mounting of the output drive element 10' in turn results in different force relationships which act on the jaws 8, 8' via the arms 11, 11' and the opposing arms 14, 14'.

The adjusting devices described operate as follows:

By means of a drive 3, for example a handwheel 4 or a lever 17 or a motor, the jaws 8, 8' can be moved in both directions of rotation within the housing 7. The portions of the jaws 8, 8' that make contact with the housing 7 are wholly adapted (see, for example, FIG. 2) or partially adapted (see, for example, FIG. 5f) in their shape to the interior of the housing 7, so that there are contact areas between them. As a result of the zero-play connection between the jaws 8, 8' of the scissors-type arrangement 12 and the output drive element 10, the actuating element 2 is also moved during a drive movement, so that any desired adjustment can be carried out. The adjusting element 2 can be a coil, a gear wheel or any other desired element transmitting a movement. Once the desired adjustment has been made, a load acts on the adjusting element 2, generally from the object to be adjusted, for example a lumbar support whose height or curvature can be adjusted, it being possible for the load to be assisted by the spring 16 or applied only by the spring 16. In this way, a load is transmitted to the output drive element 10 which, as a result of the contact between the latter and the scissors-type arrangement 12, has the effect that the scissor arms attempt to open and, in so doing, exert a pressure on the jaws 8, 8', which are supported on the opposite side and therefore prevent any opening of the scissors-type arrangement 12, that is to say locking occurs. In addition, the opposing arms 14, 14' press against the ends 15, 15' of the jaws 8, 8', so that the latter are pressed against the wall of the housing 7 and support locking because of the friction effected thereby.

It is preferable for at least the scissors-type arrangement to be produced from a flexurally rigid material, for example a preferably abrasion-resistant metal. The same is true of the areas which make contact with the scissors-type arrangement, which can also have only a hard metal covering.

What is claimed is:

1. Adjusting device for an adjusting element which is arranged on a shaft, can be adjusted as desired in both directions of rotation by means of a drive and can be locked in any set position, comprising a pair of jaws which can be moved together in a housing by means of the drive and which are in contact with a first end of a pair of arms, and a second end of the pair of arms being in contact with an output drive element which is rotatably mounted and connected to the adjusting element, wherein the pair of arms are crossed and have at least one pivot.

2. Adjusting device according to claim 1, characterised in that the pair of jaws are supported on one side on a bearing in the housing.

3. Adjusting device according to claim 1, further comprising a spring located between the first end of the pair of arms, wherein the spring which presses the pair of arms against the pair of jaws.

4. Adjusting device according to claim 1, characterised in that the pair of jaws are connected to a lever in an articulated manner.

5. Adjusting device according to claim 1, further comprising a driver having a pair of projections, wherein the driver is permanently connected to the drive and engages the pair of jaws with its projections.

6. Adjusting device according to claim 1, characterised in that the pair of jaws have a different circumferential length from each other, wherein the circumferential length is measured around a circumference of the housing.

7. Adjusting device according to claim 1, characterised in that the pair of arms consists of a flexurally rigid material.

8. Adjusting device according to claim 1, characterised in that the pair of arms arranged on a freely rotatable plate.

9. Adjusting device according to claim 8, further comprising a first pivot for one of the pair of arms and a second pivot for another of the pair of arms.

10. Adjusting device according to claim 8, characterised in that the second end of one of the pair of arm is fixedly fastened to the plate and the second end of another of the pair of arms is movably fastened to the plate.

11. Adjusting device according to claim 1, characterised in that the output drive element has rounded-off edges.

12. Adjusting device according to claim 1, characterised in that the output drive element is eccentrically mounted.

13. Adjusting device according to claim 1, characterised in that at one end, at least one jaw is angled away from the housing.

14. Adjusting device according to claim 1, characterised in that the pivot is arranged at any position between the drive element and the first end of the pair of arms which are in contact with the jaws.

15. Adjusting device according to claim 1, characterised in that the first end of the pair of arms transmit a force to the pair of jaws at a contact region.

16. Adjusting device according to claim 15, characterised in that the contact region is designed at any desired angle to a radius of the housing.

17. Adjusting device according to claim 16, further comprising a lever connected to the pair of jaws with play between the jaws and rotatably mounted in the contact region.

18. Adjusting device according to claim 16, further comprising a lever rotatably arranged on the shaft and connected with play to the jaws.

19. Adjusting device for an adjusting element which is arranged on a shaft, can be adjusted as desired in both directions of rotation by means of a drive and can be locked in any set position, comprising a pair of jaws which can be moved together in a housing by means of the drive and which are in contact with a first end of a pair of arms, and a second end of the pair of arms being in contact with an output drive element which is rotatably mounted and connected to the adjusting element, wherein the pair of arms have at least one pivot arranged at any position between the drive element and the first end of the pair of arms.

20. Adjusting device for an adjusting element which is arranged on a shaft, can be adjusted as desired in both directions of rotation by means of a drive and can be locked in any set position, comprising a pair of jaws which can be moved together in a housing by means of the drive and which are in contact with a first end of a pair of arms, and a second end of the pair of arms being in contact with an output drive element which is rotatably mounted and connected to the adjusting element, wherein the pair of arms have a scissors-type arrangement wherein the pair of arms rotate about at least one pivot between the first end and the second end.

* * * * *